United States Patent [19]

Mones Mendoza

[11] 4,382,319

[45] May 10, 1983

[54] LINK FOR JEWELLERY

[76] Inventor: Luis Mones Mendoza, Guillermo Tell, 47, Barcelona 6, Spain

[21] Appl. No.: 231,624

[22] Filed: Feb. 5, 1981

[30] Foreign Application Priority Data

Apr. 30, 1980 [ES] Spain .................................. 250.387

[51] Int. Cl.³ .............................................. A44B 13/00
[52] U.S. Cl. .................................. 24/376; 24/232 R; 24/237; 24/241 SP
[58] Field of Search ................. 24/241 PP, 230.5 AD, 24/232 R, 241 R, 236, 233, 241.5, 237, 241 P, 241 SP, 242, 373, 376

[56] References Cited

U.S. PATENT DOCUMENTS

| | | | |
|---|---|---|---|
| 603,576 | 5/1898 | Polka | 24/232 |
| 1,094,568 | 4/1914 | Hornich, Jr. | 24/236 |
| 1,235,854 | 8/1917 | Stapf | 24/236 |
| 1,390,980 | 9/1921 | Budrow | 24/232 |
| 1,841,423 | 1/1932 | Wells | 24/237 |
| 3,234,616 | 2/1966 | Wastland | 24/237 |
| 3,950,828 | 4/1976 | Szamborski | 24/232 R |

FOREIGN PATENT DOCUMENTS

| | | | |
|---|---|---|---|
| 46982 | 11/1910 | Austria | 24/241 SP |
| 190828 | 1/1923 | United Kingdom | 24/237 |

*Primary Examiner*—Paul J. Hirsch
*Attorney, Agent, or Firm*—Wenderoth, Lind & Ponack

[57] ABSTRACT

A jewelry link includes a leaf spring, the ends of which are curved to form semi-rings from which protrude arms forming semi-leaf springs, the curve of which is opposite to that of the leaf spring. The spring is thicker at its mid-point than at its ends and has a notch which constitutes a housing for an oscillating ring which is threaded through the assembly of the leaf spring, the semi-rings and the semi-leaf springs. The ring forms an oscillating catch which is retained in the notch and which, in its intermediate position, closes a space between the ends of the arms forming the semi-leaf springs.

5 Claims, 5 Drawing Figures

LINK FOR JEWELLERY

BACKGROUND OF THE INVENTION

The major problem faced by manufacturers of chains, pendants, necklaces and bracelets is undoubtedly that of the closure or catch structure.

In fact, losses of bracelets, necklaces and chains are without doubt due to the bad functioning of the closure structures.

The closure most commonly known and used in jewelry is constituted by a semi-ring having a tubular section to which is welded a ring through which it is solidly fixed to one of the terminals or end portions of the jewelry, and a lock acting along the interior of the tubular body urged by a spring, which lock, through a notch provided in the semi-ring, has an activating pivot protruding outwards. The lock tends to close the space existing between the ends of the semi-ring, the ring of the opposite end of the jewelry being enclosed in the interior.

This type of closure is not safe and although it is known by all jewelers and, in general, by all users, it is still being manufactured and used for the mere reason that an improved replacement has not as yet been found.

The problem exists and is serious. Therefore, closures having various forms have been designed which, although in the majority of the cases perfectly comply with their function, are expensive and extremely difficult to manufacture.

SUMMARY OF THE INVENTION

The object of the invention is to provide a link for jewelry which, perfectly fulfilling the function of a closure, joins the ends of a necklace, a bracelet, a chain or cuff-links, and connects then together and joins them in such a way that the ends cannot become loose due to wear or by accident.

It is important to point out, furthermore, that the link, which will subsequently be described, can be made from any of the noble materials commonly used in jewelry making, being perfectly integrated to the material constituting the jewelry.

Another important advantage is constituted by the fact that the link may be manufactured in a completely automatic manner without the intervention of hand labor and with such a high production rate that it permits the use of other materials, such as those used in imitation jewelry, without resulting in an increase in the total cost of the product as is common with the closures existing on the market.

The device of the invention includes a hook member forming a leaf spring, the ends of which are curved to form protruding semi-rings having extending therefrom arms which form semi-leaf spring portions the curvature of which is opposite to that of the leaf spring.

The leaf spring is thicker at its mid-point than at the ends, and in such mid-point is formed a notch which constitutes a housing for a ring pivoting therein and through which is threaded an assembly constituted by the leaf spring, the ends and the arms of the semi-leaf spring portions. The ring forms a catch which oscillates or is pivotable in the notch in which it is retained and which in its intermediate position closes a space existing between the confronting ends of the arms forming the semi-leaf spring portions.

The ring which forms the catch is formed from an elongated plate perforated at its ends and subsequently folded to form two legs extending from a central sector.

The ends of the legs are juxtapositioned, giving a thickness which is equal to the depth of the notch of the leaf spring, and the perforations of the plate constitute rings through which the assembly comprising the leaf spring, the ends and the semi-leaf spring portions is threaded.

The central sector of the catch is curved to form a point of retention between the ends of the semi-leaf spring portions which, by the combined flexure of the leaf spring and the semi-leaf spring portions, achieves locking by closing the space between the ends of the semi-leaf springs.

The sides of the notch made in the leaf spring diverge outwards, facilitating the oscillation or pivotting of the catch towards one semi-leaf spring portion or the other, flexing it and opening the space between the ends of the portions, to thus enable the threading of an end ring of an article of jewelry to be linked.

When the catch frees the space between the ends of the semi-leaf spring portions, it gives free access to one of the semi-rings, and is in a diagonal or inclined position and closes access to the other semi-ring.

The catch has three locking positions and the passage from one position to another may be manually forced, the central locking butt being determined by the space between the semi-leaf spring portions in combination with the central sector of the catch, while the other two positions provide free access to respective of the semi-rings and are determined by the diverging sides of the notch and the support of the catch in the semi-ring opposite to that which receives the ring.

The embodiment represented in the accompanying drawings is a mere preferred example of practical realization wherein each one of the characteristics of the invention is illustrated. However, this example should not be taken as the only possibility of realization, but as an illustration which permits the different parts forming the described link to be represented, indicated and referenced.

DETAILED DESCRIPTION OF THE INVENTION

Figure 1:
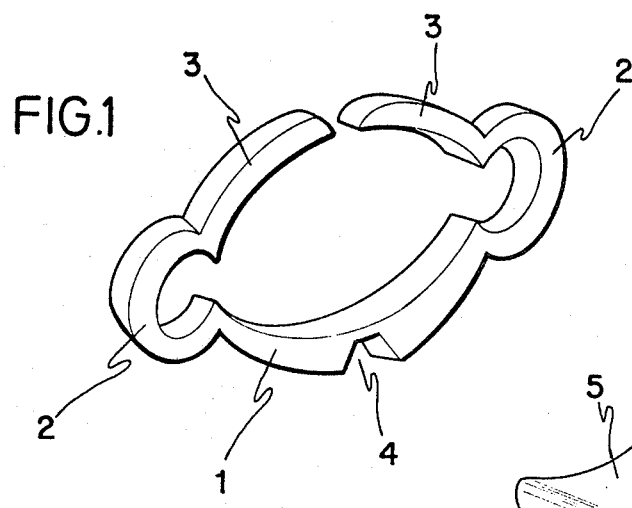
FIG. 1 is a perspective view showing the semi-rings, the leaf spring and the semi-leaf spring portions as well as the notch in which the oscillating catch will be retained.
Figure 2:
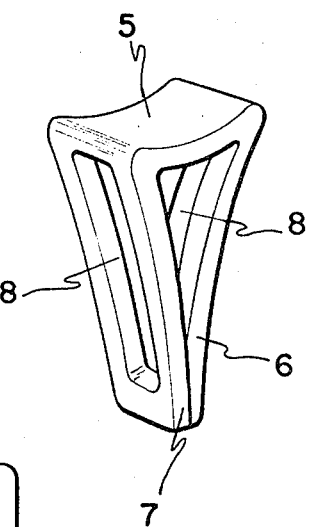
FIG. 2 is a perspective view of the catch.
Figure 3:
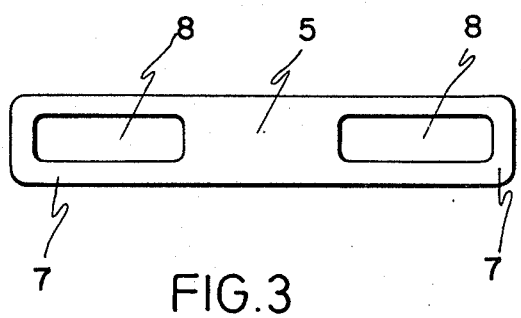
FIG. 3 is a plan view which shows the member from which the catch is formed.

With reference now to the drawings, there is illustrated therein a leaf spring 1 having curved ends forming semi-rings or semi-circular portions 2. A notch 4 is formed in the central part of the leaf spring, the side edges of which diverge outwards forming an angle which, advantageously, may be approximately 90°. The leaf spring 1 extends from first ends of the semi-circular portions 2. Extending from second ends of the portions 2 are semi-leaf springs or portions 3 which have a curvature opposite to that of leaf spring 1. Confronting ends of portions 3 are separated by a space or clearance. A catch (FIG. 2) has a central part 5 and legs 6 and 7 which are provided with orifices 8. The assembly or member formed by the leaf spring 1, the end portions 2 and semi-leaf spring portions 3 is inserted through orifices 8 in legs 6 and 7.

Coupling between both pieces, i.e. the hook member and the catch member, is also mechanically carried out using tools and mechanical means necessary so that a sufficient force is developed which causes the leaf spring 1 and the semi-leaf spring portions 3 to be so flexibly deformed that they are inserted through the orifices 8, both pieces being locked together so that it is practically impossible to unlock them again manually.

As can be seen from the drawings, the assembly is made from a single monopiece body readily obtained by die stamping which, acting on a strip of rolled material, operates automatically without the need of hand labor and at a rate sufficiently superior to 60 pieces per minute.

It is important to point out that such continuous mechanical manufacture insures, besides homogenity between all and each one of the pieces obtained, a constant production capacity with a high quality level.

Figure 4:
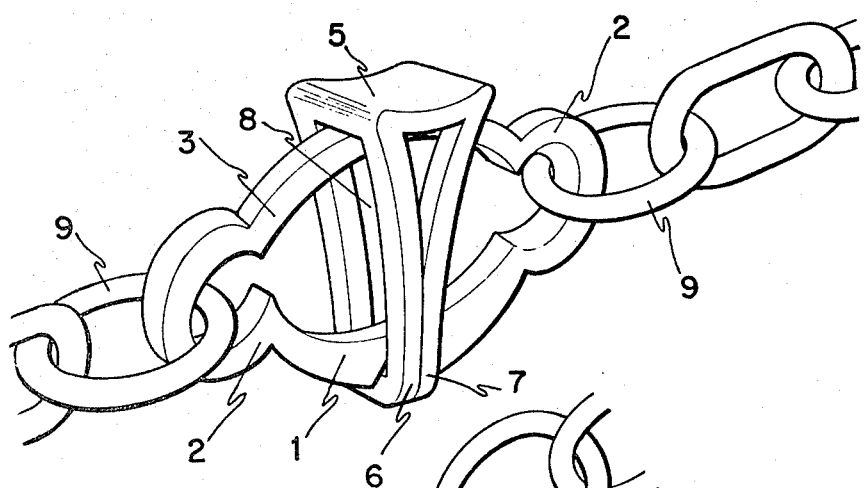
FIG. 4 is a perspective view of the link assembly retaining the terminal rings of a chain of jewelry.

As can be seen in FIG. 4, the catch is securely maintained in its rest or locked position, closing the space existing between the opposed ends of the semi-leaf spring portions 3 and preventing links or rings 9 from escaping from the device.

Figure 5:
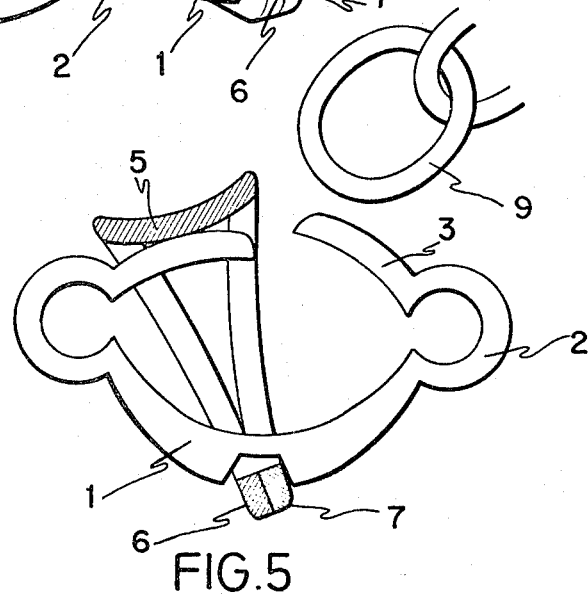
FIG. 5 is a perspective view illustrating the assembly open to enable the connection to one of the terminal rings of the chain.

Coupling of end links or rings 9 of a chain, a bracelet, a necklace, etc., is represented in FIG. 5 which illustrates how the catch, moved towards one of the ends, frees the space between the opposed ends of the semi-leaf spring portions, facilitating the passage of an end ring 9 of a chain, the catch being merely returned to its rest or locked position to ensure coupling.

It is also clear from the drawings that irrespective of the position of the catch, it is always transversely situated, insuring the retention of the already coupled ring or link.

It should be emphasized, as can be seen from the drawings, that the leaf spring 1 is thickened at the center portion of one side thereof, so that the notch 4 does not weaken the assembly, thereby maintaining the characteristics of resistance which guarantee a perfect retention and coupling of the rings of the ends of the jewelry in question.

I claim:

1. A link device for use in securely connecting end rings of an article of jewelry such as a necklace, said link device comprising:
    an integral hook member including a curved leaf spring portion having opposite ends integral with first ends of respective outwardly extending semi-circular portions, second ends of said semi-circular portions having extending therefrom respective integral arms forming semi-leaf spring portions having a curvature opposite to that of said leaf spring portion, said semi-leaf spring portions having confronting ends separated by a clearance, said leaf spring portion having a middle section having a thickness greater than that of said opposite ends, and said middle section having formed therein a notch;
    a catch member in the form of a ring having therethrough an opening through which extends said hook member, said catch member having a first portion fitting in said notch and a second portion opposite said first portion; and
    said catch member being pivotable with respect to said hook member about said first portion within said notch between an intermediate position, whereat said second portion exteriorly closes said clearance, and opposite lateral positions, whereat said second portion opens said clearance and is retained on a respective said semi-leaf spring portion.

2. A device as claimed in claim 1, wherein said catch member is formed from a flat elongated plate having orifices at the ends thereof, said plate being folded to form a pair of legs joined by a central section forming said second portion, said orifices extending through said legs and forming said opening, free ends of said legs being juxtaposed and forming said first portion and having a thickness equal to the depth of said notch.

3. A device as claimed in claim 2, wherein said central section has an inner curved surface resiliently contacting outer surfaces of said semi-leaf spring portions when said catch member is in said intermediate position.

4. A device as claimed in claim 1, wherein said notch is partially defined by outwardly diverging lateral walls.

5. A device as claimed in claim 1, wherein when said catch member is in either of said lateral positions thereof, said catch member extends diagonally with respect to said hook member, said catch member enables access through said clearance to one said semi-circular portion and prevents access to the other said semi-circular portion.

* * * * *